United States Patent [19]
Dowd et al.

[11] Patent Number: 5,899,805
[45] Date of Patent: May 4, 1999

[54] DISTRIBUTION DAMPER VALVE

[75] Inventors: Peter J. Dowd, South Windsor;
Michael D. Greenberg, Bloomfield, both of Conn.

[73] Assignee: United Technologies Corporation, Windsor Locks, Conn.

[21] Appl. No.: 08/954,506

[22] Filed: Oct. 20, 1997

[51] Int. Cl.$^6$ .................................................. B64D 13/08
[52] U.S. Cl. ............................ 454/76; 137/875; 251/297
[58] Field of Search ........................... 137/875; 251/297; 454/69, 76

[56] References Cited

U.S. PATENT DOCUMENTS

| | | | |
|---|---|---|---|
| 1,100,317 | 6/1914 | Masterson | 251/297 |
| 3,183,930 | 5/1965 | Barr | 137/875 |
| 4,316,408 | 2/1982 | Bolton et al. | 251/297 X |
| 4,749,004 | 6/1988 | Peash | 137/865 |

FOREIGN PATENT DOCUMENTS

| | | | |
|---|---|---|---|
| 177012 | 5/1935 | Switzerland | 137/875 |
| 323839 | 1/1930 | United Kingdom | 251/297 |

Primary Examiner—Harold Joyce

[57] ABSTRACT

An air distribution valve for use in a passageway of an environmental control system. The air distribution valve comprises a valve body including an input and multiple outputs defining a volume. The valve body is adapted for placement in the passageway for receiving the air in the input. A valve member is used for selectively distributing the air between the multiple outputs. Damping devices for damping the unstabilizing effect of the air flow on the valve member as the air flows to the multiple outlets allow, allowing for the lowest pressure drop configuration. An environmental control system designed for use with a vehicle includes an air cycle machine for conditioning air, ducting for distributing the air within the vehicle for a plurality of uses, and an air distribution valve for use in the ducting. The air distribution valve comprises a valve body including an input and multiple outputs defining a volume. The valve body is adapted for placement in the passageway for receiving the air in the input. A valve member is used for selectively distributing the air between the multiple outputs. Damping devices for damping the unstabilizing effect of the air on the valve member as the air flows to the multiple outlets is also provided.

19 Claims, 3 Drawing Sheets

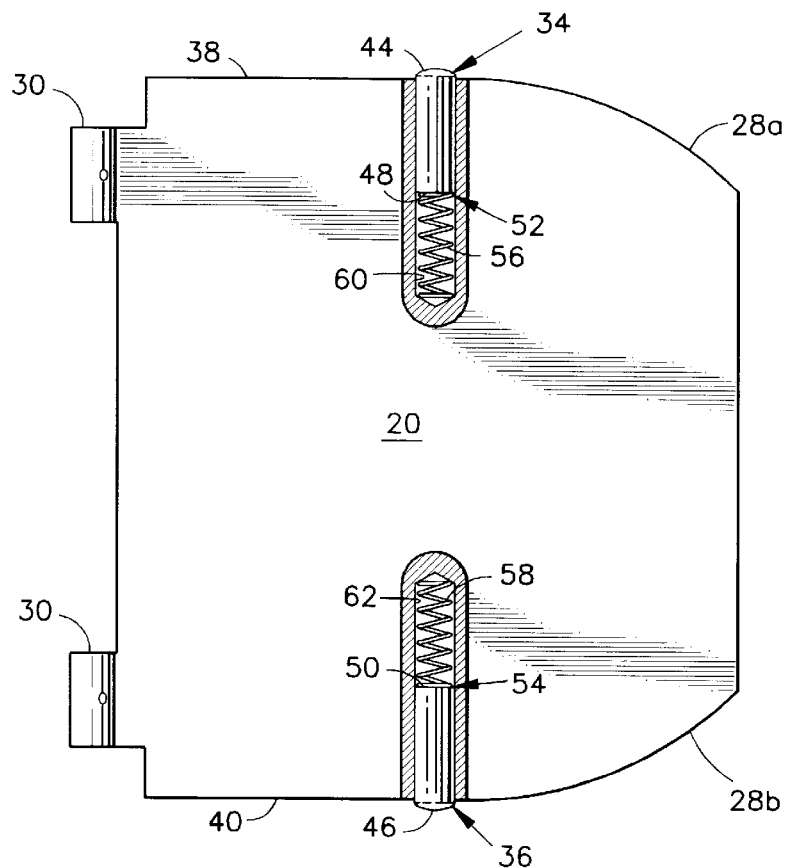
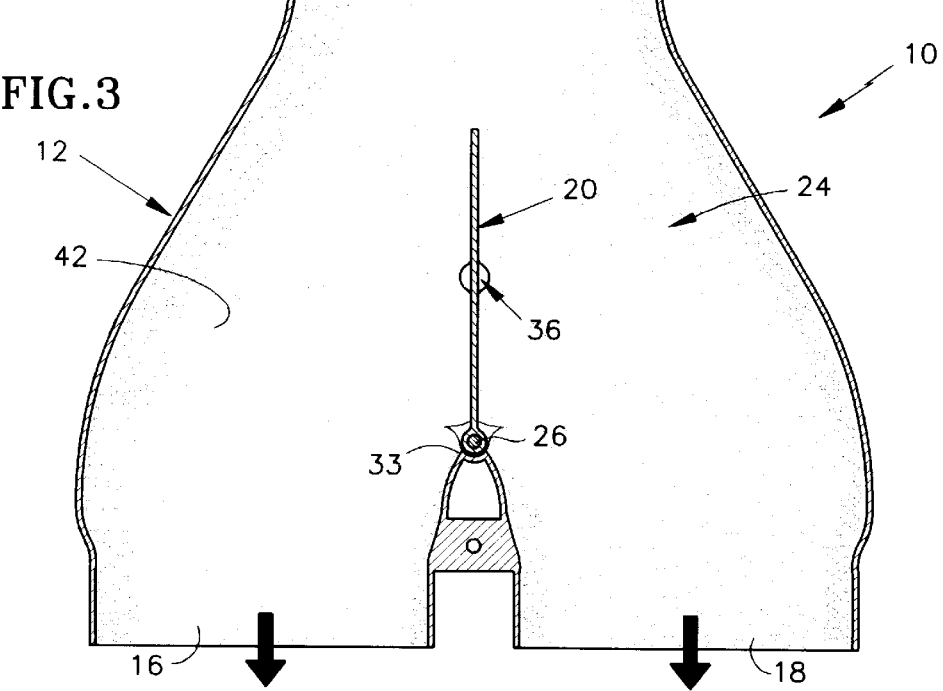

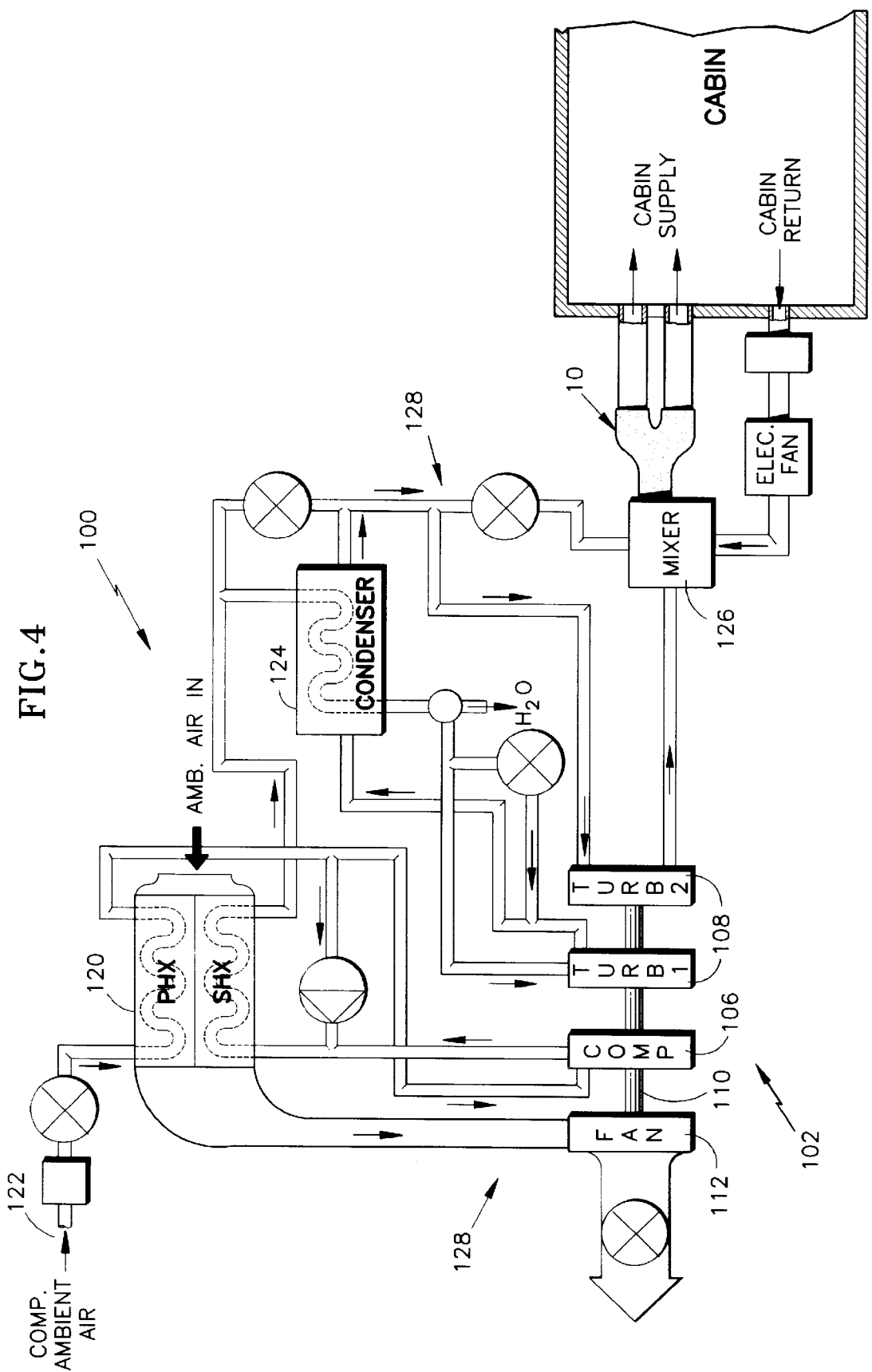

DISTRIBUTION DAMPER VALVE

TECHNICAL FIELD

This invention is directed to distribution valves, and more particularly, to a distribution valve for use in an environmental control system of an aircraft for apportioning air for different usage, wherein the distribution valve has a damped valve mechanism to improve the stability thereof.

DESCRIPTION OF THE PRIOR ART

In environmental control systems of aircraft and other vehicles, air flowing through ducts in the system at certain junctures must be apportioned and diverted to certain sections of the aircraft interior for use in cooling and/or heating. Accordingly, typically a single stream of air is split into two streams or more, at varied percentages, and subsequently directed to different uses and/or aircraft interior sections.

For achieving such a split of an airstream in the prior art, typically a y-shaped diverter valve is used having a single input connected with the airstream to be split and two or more outputs for directing the split air to different parts of a vehicle and/or for different uses. Located between the two outlet portions is typically a valving member adapted to adjustably direct desired amounts of air from the input to the plurality of outputs. Examples of these types of valves are shown in U.S. Pat. No. 3,734,113, entitled "Diverter Pinch Valve" and U.S. Pat. No. 4,718,457, entitled "Diverter Valve". In each case, a y-shaped valve body is used having a single input and two output legs. A pincher type valving member is disposed between the two output legs substantially at the nose area between the legs. In U.S. Pat. No. 3,734,113, the pincher like valving member can be used to selectively direct portions of air to the two output legs of the valve. A drive shaft is used to rotate the pincher valve member such that each output leg can be opened to a degree of 0–100% of its flow capacity depending on what is desirable for the particular application. For the valve in this patent, a pinching mechanism is provided for each incoming line such that resilient valve leg portions can be pinched thereby to change the diameter of the flow passage between the incoming line and the outgoing lines. Accordingly, by adjusting the pinching mechanism, the amount of flow through the valve is controlled. As indicated in the description of this valve, when the valve is used as a diverter valve, line pressure may tend to open the closed leg, thereby requiring the use of positive locking actuators to prevent this. As further discussed in the specification, the valve may be used as a diverter valve wherein the flow may be divided between the two leg portions. In this type of application, it would also seem that line pressure would tend to affect the positioning of the pinching mechanism thereby also requiring locking actuators to maintain the selected flow configuration. In any case, for this particular patent, the valving member is not directed to a flapper, although it is a y-shaped valve housing, and the valving member herein may be subject to adverse effects by pressure thereby requiring a mechanism to maintain the selected valve position.

U.S. Pat. No. 4,718,457, as indicated, discloses a diverter valve which has a y-shape with a single inlet and two branch passageways formed at a confluence region on the y. The valve uses a double sealing member paddle which is pivoted on a shaft and is located at the confluence of the two branches. Rotation of a shaft in one direction forces one sealing member of the paddle onto one seat for full contact and rotation and the other direction forces the other sealing member of the paddle into contact with the other seat. Accordingly, in this arrangement, no intermediate distribution position can be taken by the paddle assembly in that it must seal against one of the valve seats associated with one of the outlet legs, thereby fully closing one leg and fully opening the other. Accordingly, in this particular patent, since diversion or distribution of the air or other fluid among two or more outlets is not the application, instability of the valving member in a distribution type position is not a concern. Additional paddle or flapper type valves are discussed in U.S. Pat. Nos. 3,384,421 and 3,773,062.

There exists a need, therefore, for a distribution valve for use in distributing a fluid such as air from an input to multiple outputs wherein a valving member is used to adjust the valve to the desired distribution between the outputs and wherein the valving member is designed for stable operation during all chosen fluid distribution possibilities.

DISCLOSURE OF THE INVENTION

The primary object of this invention is to provide an improved fluid distribution valve which has a valving member which remains substantially stable during all distribution applications.

Another object of this invention is to provide an improved distribution valve for use in an environmental control system of a vehicle, which valve is operative to split an incoming air stream into multiple outgoing streams in variable distribution schemes, and which includes a valving member which exhibits good stability in all such schemes.

Still another object of this invention is to provide an improved distribution valve which includes a valving member having a damping mechanism so as to stabilize the valving member during all fluid distribution schemes.

And still another object of this invention is to provide an improved distribution valve which includes a y-shaped body having an inlet and two outlets and a valving member between the two outlets, wherein the valving member is in the form of a flapper positionable at different distribution positions between the outlets and which includes a damping mechanism to stabilize the flapper during any distribution scheme, and allows for the lowest pressure drop.

The foregoing objects and following advantages are achieved by the air distribution valve of the present invention for use in a passageway of an environmental control system.

The air distribution valve comprises a valve body including an input and multiple outputs defining a volume. The valve body is adapted for placement in the passageway for receiving the air in the input. A valve member is used for selectively distributing the air between the multiple outputs and faces upstream. Damping devices for damping the unstabilizing effect of the air flow on the valve member as the air flows to the multiple outlets is also provided, allowing for the lowest pressure drop configuration.

The objects and advantages are further achieved by the environmental control system of the present invention designed for use with a vehicle.

The environmental control system includes an air cycle machine for conditioning air, ducting for distributing the air within the vehicle for a plurality of uses, and an air distribution valve for use in the ducting. The air distribution valve comprises a valve body including an input and multiple outputs defining a volume. The valve body is adapted for placement in the passageway for receiving the air in the input. A valve member is used for selectively distributing the air between the multiple outputs. Damping devices for damping the unstabilizing effect of the air on the valve member as the air flows to the multiple outlets is also provided.

BRIEF DESCRIPTION OF THE DRAWINGS

FIG. 2 is an elevational and partially cut-away view of the valving member of the present invention;

FIG. 3 is a partially cross-sectional view of the valve shown in FIG. 1 taken along line 3—3 thereof, and FIG. 4 is a schematic view of an environmental control system using the distribution damper valve of the present invention.

BEST MODE FOR CARRYING OUT THE INVENTION

Figure 1:
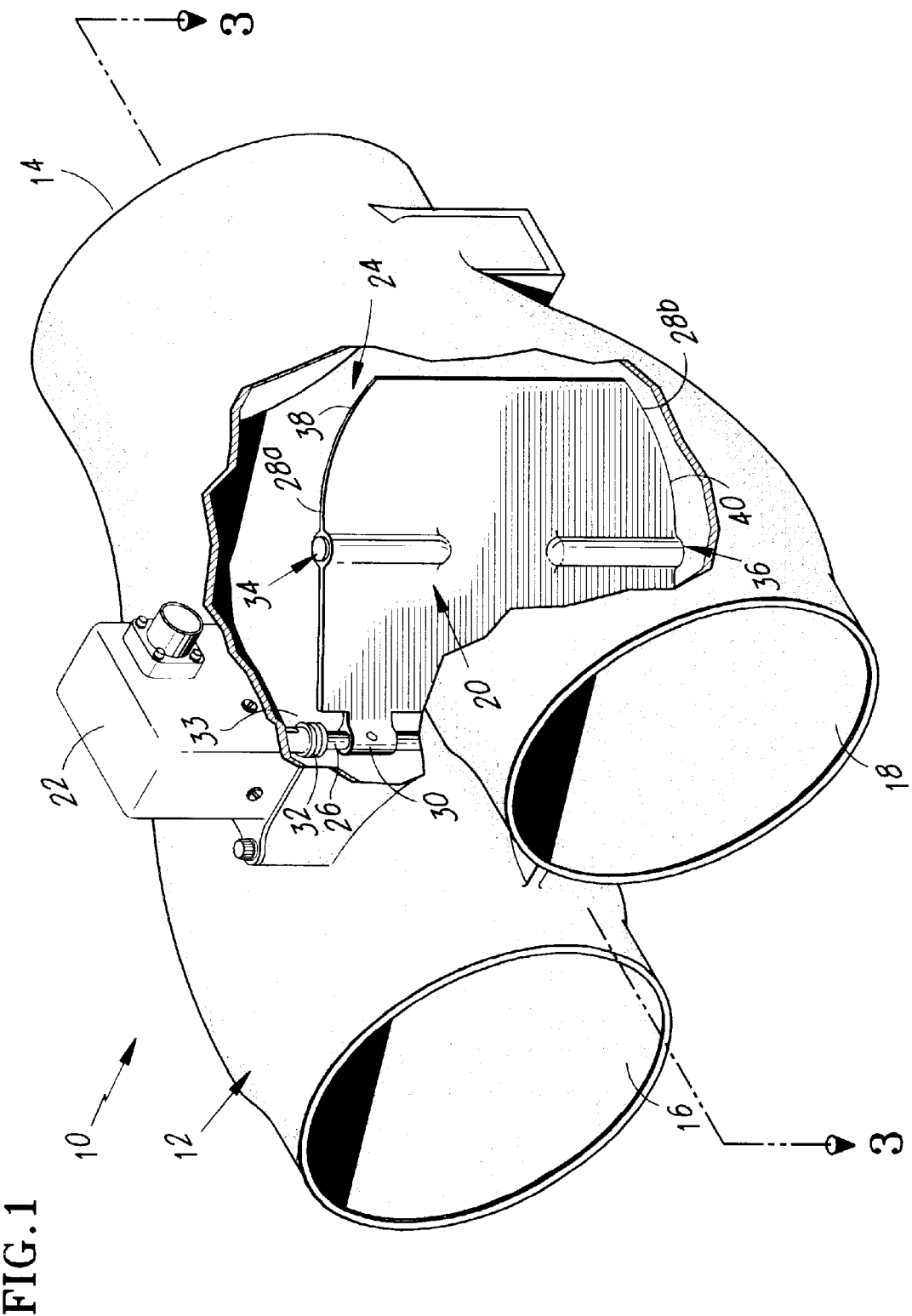
FIG. 1 is a perspective and partially cut-away view of the distribution view damper valve of the present invention.

Referring now to the drawings in detail, there is shown in FIG. 1 a perspective cut-away view of the distribution damper valve of the present invention, designated generally as 10. Valve 10 generally includes a y-shaped valve housing 12 including an inlet 14 and two outlets 16 and 18, a valving member 20 in the form of a flapper, and an actuator 22 for operating flapper 20.

Valve housing 12 is preferably y-shaped as shown in FIG. 1 and inlet 14 is preferably slightly larger than each of outlets 16 and 18. Accordingly, valve housing 12 defines a volume 24 through which air flows. The housing is preferably made from an aluminum casting, but other materials can be used as required.

As shown in FIGS. 1–3, flapper 20 is in the form of a thin flap or plate which is rotatable in housing 12 on shaft 26, and is directed upstream from the outlets to the inlet, resulting in better performance due to lower pressure drop. Preferably, flapper 20 is substantially rectangular in shape having rounded corners 28a and 28b. Flapper 20 includes cylindrical connectors 30 for attaching to shaft 26. Connectors 30 may be in the form of a teflon bushing or other low friction material such that flapper 20 freely rotates on shaft 26. Valve housing 12 includes a semi-cylindrical shaft housing 32 positioned at the nose area 33 in volume 24 between outlets 16 and 18. Rotary actuator 22 is connected with shaft 26 within shaft housing 32, as shown in FIG. 1, for rotating flapper 20. In the preferred design, flapper 20 is rotatable via actuator 22 on shaft 26 between first, second and third positions such that in a first position, 70% of the air is diverted to outlet 16 and 30% to outlet 18, and a second position, or intermediate position, flapper 20 is centrally positioned such that the air is equally split among outlets 16 and 18, and in the third position, the flapper 20 is positioned such that 70% of the air is directed to outlet 18 and 30% to outlet 16. By adjusting the actuator 22 and if necessary the shape of flapper 20, different percentages and positions can be achieved by the valve of the present invention. In the preferred application, one outlet 16 is considered an upper udistribution outlet for cooling use and the other outlet 18 is considered a low distribution outlet for heating use.

As shown in FIGS. 1 and 2, flapper 20 includes dampers 34 and 36. As shown in the elevational, cross-sectional view of FIG. 2 and in the perspective view of the valve in FIG. 1, dampers 34 and 36 extend from edges 38 and 40, respectively, of flapper 20 and into contact with the inner surface 42 of valve housing 12. This contact provides a resistance or drag to flapper 20 such that when the flapper is in the intermediate position, as shown in FIG. 3, stability is provided. That is, as the air flows from inlet 14 to outlet 16 and 18, in intermediate position, the flapper is subject to the force of air flowing on each side. Accordingly, without dampers 34 and 36, substantial flutter can result thereby effecting the wear and functionality of the valving mechanism, i.e. the flapper, shaft and actuator assembly. With specific reference to FIG. 2 and the cross-sectional view of the dampers as positioned in flapper 20, each damper 34 and 36 includes an external end 44 and 46, respectively, and an internal end 48 and 50, respectively. Internal ends 48 and 50 form a spring seat 52 and 54, which engage springs 56 and 58, in cavities 60 and 62, respectively. Accordingly, dampers 34 and 36 are spring loaded against internal surface of valve housing 12 such that a relatively constant but resilient force is used to force dampers 34 and 36 against inner surface 42. In the preferred embodiment, the dampers 34 and 36 are formed from a nylon cylinder and external ends 44 and 46 are preferably spherically configured for safe contact with the internal wall of the valve housing. By providing the rotational drag to the flapper, the adverse effects of system backlash and flutter, which can be especially prevalent in the intermediate position, are reduced.

As shown in FIG. 4, valve 10 is preferably used in an environmental control system, specifically that of an aircraft. Environmental control system 100 includes an air cycle machine 102 for conditioning air for use in the cabins of the aircraft or other vehicle, heat exchangers 120, ram air duct 122, condenser 124, mixer 126, and the connecting duct work 128. The air cycle machine 102 includes the housing (not shown), a compressor device 106, turbines 108, a shaft 110 connecting the turbine 108 to the compressor 106 and a fan 112. The preferred air cycle machine operates in a known manner such that the compressor 106 receives high temperature air from a source such as the compressor of an aircraft engine, a ground cart, and compresses and cools this air. The air is then directed through lines to the turbine wherein the turbine functions to expand the compressed cooled air and use the energy from such expansion to drive the compressor and fan. The expanded air is then directed to the aircraft environmental control system ducting for various uses. With regard to the valve 10 of the present invention, it is preferably positioned in the duct work of the ECS 100 downstream of the air cycle machine 102. Air is then directed into the inlet 14 and onward to the upper distribution outlet 16 and subsequent ducting and a lower distribution outlet 18 and subsequent ducting wherein from the upper distribution duct, air is further diverted for cooling and from the lower distribution duct 18, air is further diverted for heating. The air is split via flapper 20 as discussed above, preferably in one of three settings, wherein for the first setting, 70 percent of the air is directed to the upper distribution outlet 16 and 30 percent to the lower distribution outlet 18, and a second setting the air is equally split between outlet 16 and 18, and in a third setting, 70% of the air is directed to the lower distribution outlet 18 and 30 percent to the upper distribution outlet 16. However, as indicated above, with adjustments to the valving mechanism, different percentages can be achieved as required by the overall system. By using the y-shaped valve housing 12, and an upstream facing flapper, a low pressure drop across the valve results due to the airflow path. In accordance with this low pressure drop, overall system performance is enhanced.

The primary advantage of this invention is that an improved fluid distribution valve is provided which has a valving member which remains substantially stable during all distribution applications. Another advantage of this invention is that an improved distribution valve is provided for use in an environmental control system of a vehicle which valve is operative to split an incoming air stream into multiple outgoing streams in variable distribution schemes, and which includes a valving member which exhibits good stability in all such schemes. Still another advantage of this invention is that an improved distribution valve is provided which includes a valving member having a damping mechanism so as to stabilize the valving member during all fluid distribution schemes. And still another advantage of this invention is that an improved distribution valve is provided which includes a y-shaped body having an inlet and two outlets and a valving member between the two outlets, wherein the valving member is in the form of a flapper positionable at different distribution positions between the outlets and which includes a damping mechanism to stabilize the flapper during any distribution scheme.

Although the invention has been shown and described with respect to a best mode embodiment thereof, it should be understood by those skilled in the art that the foregoing and various other changes, omissions, and additions in the form and detail thereof may be made without departing from the spirit and scope of the invention.

We claim:

1. An air distribution valve for use in a passageway of an environmental control system, comprising:
    a valve body including an input and multiple outputs defining a volume, said valve body adapted for placement in the passageway for receiving the air in said input;
    means for selectively distributing the air between said multiple outputs; and
    means for damping the unstabilizing effect of the air on said means for selectively distributing as the air flows to said multiple outlets, wherein said means for damping comprises extensions connected to and extending from said means for selectively distributing into contact with said valve body for creating drag therebetween.

2. The valve according to claim 1, further including means for adjusting position of said means for selectively distributing.

3. The valve according to claim 2, wherein said means for selectively distributing is a flapper.

4. The valve according to claim 3, wherein each of said multiple outputs has an inlet and an outlet, and wherein said flapper is moveable via said means for adjusting relative to each inlet for distributing the air between said multiple outputs.

5. The valve according to claim 1, further comprising means for resiliently positioning said extensions relative to said means for selectively distributing.

6. The valve according to claim 1, wherein said extensions have an external end and an internal end, said internal end positioned within said means for selectively distributing and said external end positioned outside of said means for selectively distributing and adapted to contact said valve body, wherein said means for resiliently positioning comprises a resilient member located between said means for selectively distributing and said internal end.

7. The valve according to claim 6, wherein said resilient member is a spring.

8. The valve according to claim 1, wherein said valve body is substantially Y-shaped, said input is a single input and said multiple outputs are two outputs, and wherein said means for selectively distributing is positioned between said two outputs.

9. The valve according to claim 8, wherein said means for selectively distributing comprise a flapper.

10. The valve according to claim 5, wherein said means for selectively distributing comprise a flapper.

11. The valve according to claim 6, wherein said means for selectively distributing comprise a flapper.

12. An environmental control system for a vehicle, including:
    an air cycle machine for conditioning air;
    means for selectively distributing the air within the vehicle for a plurality of uses; and
    an air distribution valve for use in said means for distributing, comprising a valve body including an input and multiple outputs defining a volume, said valve body adapted for placement in said means for distributing or receiving the air in said input, means for selectively distributing the air between said multiple outputs and to said means for distributing, and means for damping the unstabilizing effect of the air on said means for selectively distributing as the air flows to said multiple outlets, wherein said means for damping comprises extensions connected to and extending from said means for selectively distributing into contact with said valve body for creating drag therebetween.

13. The environmental control system according to claim 12, further including means for adjusting position of said means for selectively distributing.

14. The environmental control system according to claim 13, wherein said means for selectively distributing is a flapper.

15. The environmental control system according to claim 14, wherein each of said multiple outputs has an inlet and an outlet, and wherein said flapper is moveable via said means for adjusting relative to each inlet for distributing the air between said multiple outputs.

16. The environmental control system according to claim 13, further comprising means for resiliently positioning said extensions relative to said flappers.

17. The environmental control system according to claim 13, wherein said extensions have an external end and an internal end, said internal end positioned within said flapper and said external end positioned outside of said flapper and adapted to contact said valve body, wherein said means for resiliently positioning comprises a resilient member located between said flapper and said internal end.

18. The environmental control system according to claim 17, wherein said resilient member is a spring.

19. The environmental control system according to claim 18, wherein said valve body is substantially Y-shaped, said input is a single input and said multiple outputs are two outputs, and wherein said means for selectively distributing is positioned between said two outputs.

* * * * *